United States Patent
Wojcik

(10) Patent No.: US 6,860,550 B2
(45) Date of Patent: Mar. 1, 2005

(54) BUCKET SEAT FOLD OUT DIAPER CHANGING TABLE

(75) Inventor: Francis Wojcik, St. Clair Shores, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 113 days.

(21) Appl. No.: 10/305,989

(22) Filed: Nov. 26, 2002

(65) Prior Publication Data

US 2004/0099186 A1 May 27, 2004

(51) Int. Cl.$^7$ ............... B60N 2/32; A47B 37/00; A47B 57/58; A47B 83/02; A47C 13/00

(52) U.S. Cl. ............... 297/163; 297/167; 297/188.04; 297/188.05; 297/112; 297/118; 297/119; 297/120; 297/124; 297/125; 297/126; 108/44; 108/90; 108/93

(58) Field of Search ............... 297/163, 165, 297/167, 168, 188.01, 188.04, 188.05, 112, 118, 119, 120, 124, 125, 126, 164, 188.61; 108/42, 44, 90, 93

(56) References Cited

U.S. PATENT DOCUMENTS

| 333,892 | A | * | 1/1886 | Ross ............... 297/125 X |
|---|---|---|---|---|
| 614,722 | A | * | 11/1898 | Isaacs ............... 108/93 X |
| 1,257,843 | A | * | 2/1918 | Gonyea ............... 108/93 |
| 1,449,436 | A | * | 3/1923 | Neill ............... 297/126 X |
| 2,333,516 | A | * | 11/1943 | Brusilowsky ............... 108/93 |
| 2,555,659 | A | * | 6/1951 | Rose ............... 297/118 X |
| 3,094,354 | A | * | 6/1963 | Bernier ............... 297/112 |
| 3,163,287 | A | * | 12/1964 | Barnett ............... 224/540 |
| 3,406,933 | A | * | 10/1968 | Wait et al. ............... 248/80 |
| 4,668,010 | A | * | 5/1987 | Fujiwara ............... 297/188.04 X |
| 5,286,084 | A | * | 2/1994 | Bart ............... 297/188.04 X |
| 5,322,344 | A | * | 6/1994 | Hoffman et al. ............... 297/188.04 |
| 5,370,060 | A | * | 12/1994 | Wang ............... 108/44 |
| 5,788,324 | A | * | 8/1998 | Shea et al. ............... 297/188.04 X |
| 5,882,069 | A | * | 3/1999 | Gunnett et al. ............... 297/125 |
| 6,059,358 | A | * | 5/2000 | Demick et al. ............... 297/188.04 |
| 6,219,866 | B1 | * | 4/2001 | Pascal ............... 5/655 |
| 6,220,660 | B1 | * | 4/2001 | Bedro et al. ............... 297/188.04 |
| 6,308,641 | B1 | * | 10/2001 | Kingbury ............... 108/42 |
| 6,421,856 | B1 | * | 7/2002 | Furnback ............... 5/655 |
| 6,439,134 | B1 | * | 8/2002 | Ryburg ............... 108/42 |
| 6,648,395 | B2 | * | 11/2003 | Hoshino ............... 297/188.04 X |
| 6,648,430 | B2 | * | 11/2003 | Rohde et al. ............... 312/301 |
| 6,666,149 | B1 | * | 12/2003 | Lathrop ............... 108/44 |

* cited by examiner

Primary Examiner—Rodney B. White
(74) Attorney, Agent, or Firm—Ralph E. Smith

(57) ABSTRACT

A bucket seat fold out diaper changing table located within a vehicle. The table provides a surface for use while changing the diaper or clothing of an infant or for other activities and objects that require a surface area. The table is configured as a plastic molded seat back of a bucket seat. The table includes a surface member that provides a surface area, a first open end and a second open end. A first panel and a second panel are arranged within the surface member. The first panel slides out of the first open end of the surface member and retracts back into the surface member via the first open end. The second panel slides out of the second open end of the surface member and retracts back into the surface member via the second open end. The first panel and the second panel are used to provide additional surface area for facilitating the changing of an infant or other activity requiring table surface area.

7 Claims, 1 Drawing Sheet

BUCKET SEAT FOLD OUT DIAPER CHANGING TABLE

FIELD OF THE INVENTION

The present invention relates to a table included on a bucket seat of a vehicle.

BACKGROUND INFORMATION

Seats in vehicles, such as minivans, may be placed in a folded, horizontal position and may be used for other purposes than for seating. In other systems, the plastic molded seat back on the seat may be configured to have molded cup place indentations that allow passengers within the vehicle to securely place objects such as beverage containers within the vehicle. Currently, plastic molded seat backs serve no other purpose than for beverage container placement.

SUMMARY OF THE INVENTION

The present invention provides a bucket seat fold out diaper changing table. The table may be located within a vehicle to provide a surface for use while changing an infant's diaper or clothing or for other activities and objects that require a surface area. The table may be a plastic molded seat back of a bucket seat arranged in a vehicle. The present invention includes a surface member that provides a surface area, a first open end and a second open end. A first panel and a second panel may be arranged within the surface member. The first panel may slide out of the first open end of the surface member and may also retract back into the surface member via the first open end. The second panel may slide out of the second open end of the surface member and may also retract back into the surface member via the second open end. The first panel and the second panel are used to provide additional surface area for facilitating the changing of an infant or other activity requiring table surface area.

DETAILED DESCRIPTION

Figure 1:
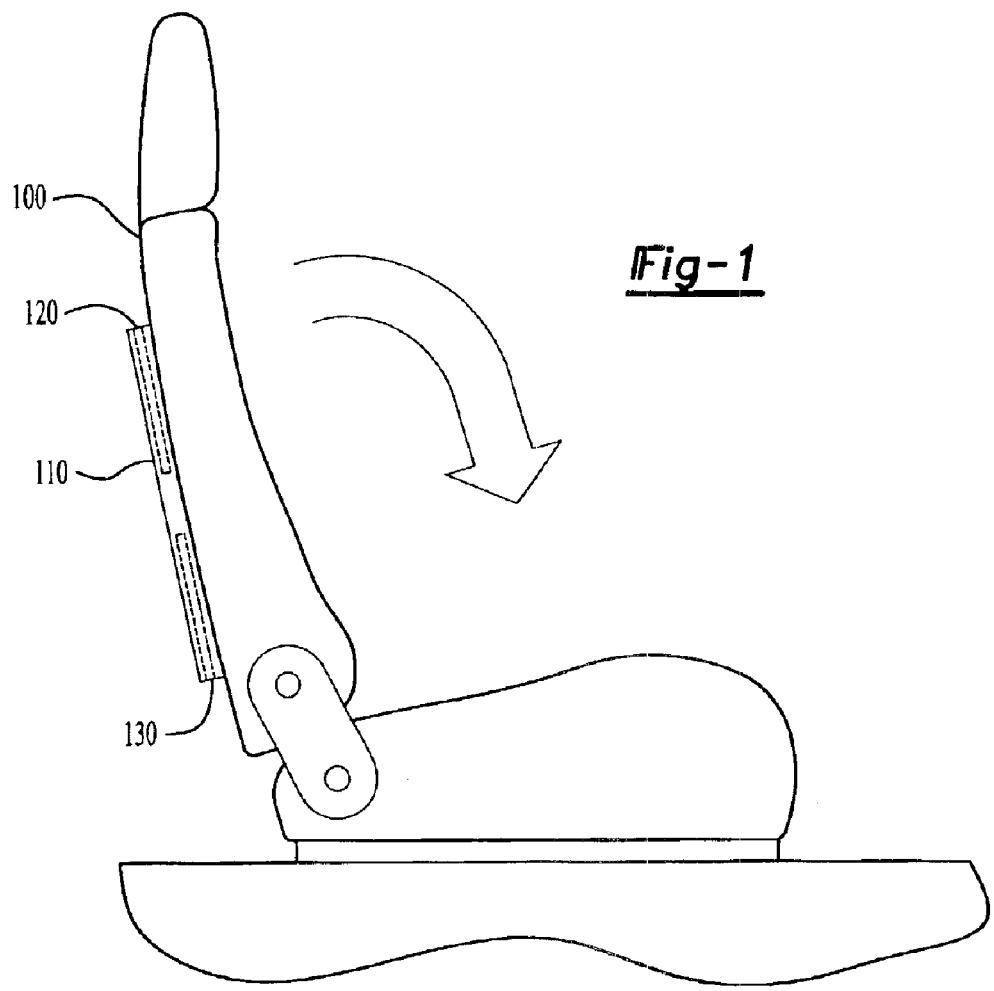
FIG. 1 shows an exemplary embodiment of the table according to the present invention.

FIG. 1 shows an exemplary embodiment of the table according to the present invention. The table may be located within a motor vehicle to provide a surface that may be used to place an infant while changing the infant's diaper or clothing. The table may be used for other activities and objects that require a surface area. In the exemplary embodiment, the table is a plastic molded seat back of a seat 100 arranged in a vehicle. The table may be located in other locations within the vehicle.

A surface member 110 provides a surface area that may support an infant. The surface member 110 includes a first open end 120 and a second open end 130. The surface member may be, for example, a housing, a rectangular box, a cube, or any other solid or hollow shape for providing a horizontal surface.

Figure 2:
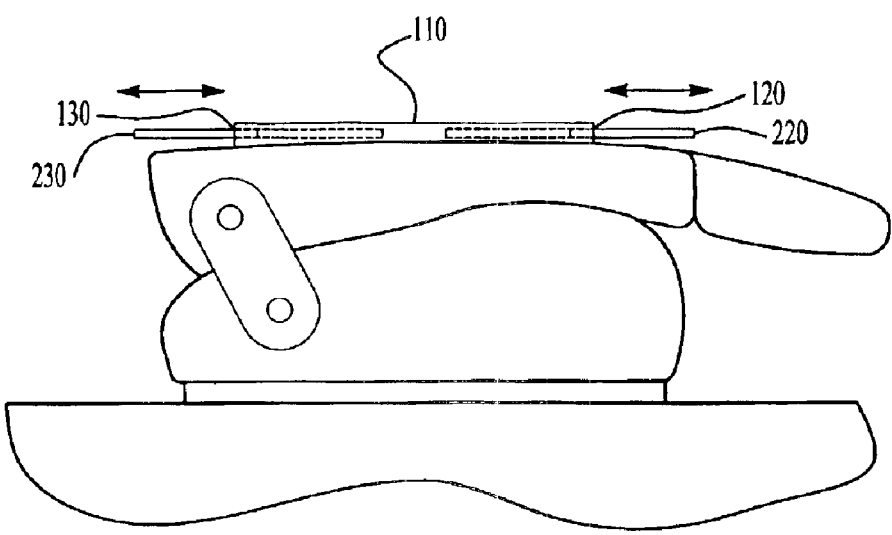
FIG. 2 shows the exemplary embodiment of the present invention when the bucket seat is in a folded, horizontal position.

FIG. 2 shows the exemplary embodiment of the present invention when the bucket seat 100 is in a folded, horizontal position. A first panel 220, for example, of a rectangular shape, may be arranged within the surface member 110. The first panel 220 may slide out of the first open end 120 of the surface member 110 and may also retract back into the surface member 110 via the first open end 120. Additionally, a second panel 230, for example, of a rectangular shape, is arranged within the surface member 110. The second panel 230 may slide out of the second open end 130 of the surface member 110 and may also retract back into the surface member 110 via the second open end 130. The first panel 220 and the second panel 230 may be used to provide additional surface area for facilitating the changing of an infant or other activity requiring table surface area. The surface member 110, the first panel 220 and the second panel 230 may be manufactured of a plastic material, or other suitable surface material. The first panel 220 and the second panel 230 may be stored, for example, inside or outside of the surface member 110, so that, the first panel 220 and the second panel 230 may be situated either directly alongside the surface member 110, or slightly above or below that position. Also, more or less panels may be provided.

The first panel 220 and the second panel 230 may be configured to partially slide out of the surface member 110. This may allow the first panel 220 and the second panel 230 to be adjusted and hence provide varying sizes of surface area for use while changing an infant or performing other activities.

In a further exemplary embodiment of the present invention the table according to the present invention may be detachable from the back of the seat. The table may be removed from the back of the seat and then attached to another seat back in the vehicle. The table, when not attached to a seat back, may be used by placing it on a horizontal surface.

What is claimed is:

1. In a vehicle having a passenger seat with a seat back having a first free end and an opposite second end pivotably coupled to a seat cushion and wherein the seat back may be pivoted fowardly about its second end to overlie the seat cushion in a substantially horizontal position, a table comprising:

a surface member adapted to be coupled to a back side of the seat back, and having first and second open ends respectively facing the first and second ends of the seat back;

a first panel housed in the surface member and being slidably extendable and retractable through the first open end; and a second panel housed in the surface member and being slidably extendable and retractable through the second open end;

wherein the surface member and the first and second panels provide an adjustable work surface area whenever the seat back is pivoted to the substantially horizontal position.

2. The table of claim 1, wherein the surface member, the first panel and the second panel are composed of a plastic material.

3. The table of claim 1, wherein the first panel and the second panel are configured to partially slide out of the surface member.

4. The table of claim 1, wherein the adjustable work surface area is used for supporting an infant while the infant is being dressed.

5. The table of claim 1, wherein the surface member is one of a housing, a rectangular box, a cube, a solid shape, and a hollow shape that provides a horizontal surface.

6. The table of claim 1, wherein the table is detachable from the back side of the seat and attachable to another seat in the vehicle.

7. The table of claim 6, wherein when the table is not attached to the back side of the seat it is used by placing the table on a horizontal surface.

* * * * *